(12) United States Patent
Coleman et al.

(10) Patent No.: US 11,485,637 B2
(45) Date of Patent: Nov. 1, 2022

(54) PROCESS FOR PURIFYING A SYNTHESIS GAS

(71) Applicants: Luke J. Coleman, Williamsville, NY (US); Kihyung Kim, Atlanta, GA (US); Garrett R. Swindlehurst, Saint Paul, MN (US); Minish M. Shah, E. Amherst, NY (US)

(72) Inventors: Luke J. Coleman, Williamsville, NY (US); Kihyung Kim, Atlanta, GA (US); Garrett R. Swindlehurst, Saint Paul, MN (US); Minish M. Shah, E. Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 206 days.

(21) Appl. No.: 17/076,385

(22) Filed: Oct. 21, 2020

(65) Prior Publication Data

US 2022/0041442 A1 Feb. 10, 2022

Related U.S. Application Data

(60) Provisional application No. 63/063,646, filed on Aug. 10, 2020.

(51) Int. Cl.
*C01B 3/56* (2006.01)
*C01B 32/40* (2017.01)
(Continued)

(52) U.S. Cl.
CPC .............. *C01B 3/56* (2013.01); *B01D 53/047* (2013.01); *C01B 3/24* (2013.01); *C01B 3/501* (2013.01);
(Continued)

(58) Field of Classification Search
CPC .. C01B 3/56; C01B 3/24; C01B 3/501; C01B 32/40; C01B 2203/0233;
(Continued)

(56) References Cited

U.S. PATENT DOCUMENTS 4,732,596 A 3/1988 Nicholas et al.
4,836,833 A 6/1989 Nicholas et al.
(Continued)

OTHER PUBLICATIONS

Peter Haussinger et al., "Hydrogen, 3. Purification", Ullmann's Encyclopedia of Industrial Chemistry, Oct. 15, 2011, XP055070696, pp. 312-313 and 331.

*Primary Examiner* — Steven J Bos
*Assistant Examiner* — Syed T Iqbal
(74) *Attorney, Agent, or Firm* — Lurie A. Schwartz

(57) ABSTRACT

The present invention provides for a pressure swing adsorption (PSA) process for the substantial removal of $H_2O$ and $CO_2$ from a synthesis gas to obtain a multicomponent product gas substantially free of $H_2O$ and $CO_2$ with high recovery of the product gas. Further, the present invention provides an integrated process that achieves sufficiently high $H_2$ and CO recoveries such that compression and recycling of the syngas purification PSA tailgas is not necessary to be economically advantageous compared to the conventional processes.

17 Claims, 7 Drawing Sheets

(51) Int. Cl.
  *B01D 53/047* (2006.01)
  *C01B 3/24* (2006.01)
  *C01B 3/50* (2006.01)

(52) U.S. Cl.
  CPC .......... *C01B 32/40* (2017.08); *B01D 2256/16* (2013.01); *B01D 2256/20* (2013.01); *B01D 2257/504* (2013.01); *B01D 2257/80* (2013.01); *C01B 2203/025* (2013.01); *C01B 2203/0233* (2013.01); *C01B 2203/0244* (2013.01); *C01B 2203/043* (2013.01); *C01B 2203/0405* (2013.01); *C01B 2203/046* (2013.01); *C01B 2203/0475* (2013.01); *C01B 2203/0495* (2013.01); *C01B 2203/1241* (2013.01); *C01B 2203/145* (2013.01); *C01B 2203/146* (2013.01)

(58) Field of Classification Search
  CPC ...... C01B 2203/0244; C01B 2203/025; C01B 2203/0405; C01B 2203/043; C01B 2203/046; C01B 2203/0475; C01B 2203/0495; C01B 2203/1241; C01B 2203/145; C01B 2203/146; C01B 2203/0827; C01B 3/34; B01D 53/047; B01D 2256/16; B01D 2256/20; B01D 2257/504; B01D 2257/80; B01D 2253/104; B01D 2253/25; B01D 2259/40052; B01D 2259/40056
  See application file for complete search history.

(56) References Cited

U.S. PATENT DOCUMENTS

| | | | |
|---|---|---|---|
| 5,073,356 A | * | 12/1991 | Guro ................. C01B 32/40 423/247 |
| 6,328,945 B1 | | 12/2001 | Hufton et al. |
| 7,066,984 B2 | | 6/2006 | Dunn |
| 9,458,013 B1 | | 10/2016 | Sicinski et al. |
| 2008/0308769 A1 | | 12/2008 | Marty et al. |

* cited by examiner

PROCESS FOR PURIFYING A SYNTHESIS GAS

RELATED APPLICATION

The present application claims priority from U.S. Application Ser. No. 63/063,646, filed Aug. 10, 2020, which is incorporated by reference herein in its entirety.

FIELD OF THE INVENTION

The present invention is related to the adsorptive purification of synthesis gas containing at least hydrogen ($H_2$), carbon monoxide (CO), methane ($CH_4$), carbon dioxide ($CO_2$), and water ($H_2O$) to obtain a purified $H_2$-rich gas and a purified CO-rich gas. More specifically, the present invention provides for a pressure swing adsorption (PSA) process for the substantial removal of $H_2O$ and $CO_2$ from a synthesis gas to obtain a multicomponent product gas substantially free of $H_2O$ and $CO_2$ with high recovery of the product gas. Further, the present invention provides an integrated process that achieves sufficiently high $H_2$ and CO recoveries such that compression and recycling of the syngas purification PSA tailgas is not necessary to be economically advantageous compared to the conventional processes.

BACKGROUND OF THE INVENTION

The production of synthesis gas (syngas), defined herein as a mixture comprised of at least $H_2$, CO, $CH_4$, $CO_2$, and $H_2O$, by reforming, partial oxidation, or autothermal reforming of hydrocarbons, typically natural gas, is well known in industry. The related art provides numerous examples of conventional processes for the generation, purification, and separation of syngas for the individual recovery of high-purity $H_2$ and high-purity CO from syngas including U.S. Pat. Nos. 4,732,596, 6,328,945 B1, and 7,066,984 B2 to Nicholas, Hufton and Dunn respectively. In conventional syngas purification processes, raw syngas is purified to effectively remove $H_2O$ and $CO_2$ prior to being cryogenically separated. Failure to adequately remove $H_2O$ and $CO_2$, as well as other species that form solids at sub-ambient temperatures leads to fouling and plugging of the heat exchange and separation equipment that make up the downstream cryogenic separation equipment. This ultimately leads to ineffective heat transfer and an increase in the pressure drop resulting in poor separation. The formation and accumulation of solids in the cryogenic separation equipment is commonly known in the field as "freeze-up" and represents both an operational and safety risk to the plant. This solid contamination usually precipitates a shutdown of the entire syngas plant to "thaw" the cryogenic separation equipment and purge it of the contaminants. Much of the complexity in a conventional CO production process is the result of purification to remove substantially all $H_2O$ and $CO_2$ from the feed gas to the cryogenic separation unit to avoid freeze-up.

In conventional integrated processes, the majority of $CO_2$ is removed from a raw syngas stream via a wash system typically utilizing an aqueous solution of monoethanolamine (MEA), methyldiethylamine (MDEA), or activated MDEA to reduce the $CO_2$ concentration from percent (%) levels typically to ppm levels. The treated syngas stream is then introduced to a temperature swing adsorption (TSA) process unit, commonly referred to as a syngas dryer, to remove substantially all $H_2O$ and $CO_2$ and other species that form solids at cryogenic temperatures. The purified syngas stream, substantially free of $H_2O$ and $CO_2$, is then fed to a cryogenic separation unit resulting in the production of at least a $H_2$-rich stream and a CO-rich stream.

Such conventional process schemes that utilize multiple process units for the sequential removal of $H_2O$ and $CO_2$ from the syngas mixture are effective, but expensive. Meaningful reduction in the cost of the process in terms of the initial capital investment can only be realized with the integration and/or elimination of process units without negatively affecting the scale or complexity of the remaining process units. One approach to reducing complexity and initial capital cost of the integrated process is to replace the purification process units with a single, pressure swing adsorption (PSA) process unit that performs the role of the purification units—the effective removal of $H_2O$ and $CO_2$ from syngas. Such PSA purification units have been described in the related art.

U.S. Pat. No. 4,732,596 to Nicholas et al. discloses a method for the production of high-purity $H_2$ and high-purity CO from a mixed gas stream wherein the process includes an adsorption process unit that produces a dry $CO_2$-freed syngas stream prior to be being fed to a cryogenic separation unit. The disclosed method describes the regeneration of the $H_2O$ and $CO_2$ adsorption process using purge gas substantially free of $H_2O$ and $CO_2$, that originates from downstream process units. The tail gas stream from the $H_2O$ and $CO_2$ adsorption unit is compressed and recycled to the syngas generation unit.

U.S. Pat. No. 4,836,833 to Nicholas et al. discloses a method for the individual recovery of high-purity $H_2$ and high-purity CO from a contaminated mixed gas stream containing these components in addition to $CO_2$ and $CH_4$ wherein $CO_2$ is selectivity adsorbed from the mixed gas stream prior to the product gas being fed to downstream separation units. The selectively adsorbed contaminants are desorbed during regeneration, compressed, and recycle to the syngas generation unit.

U.S. Pat. No. 5,073,356 to Giro et al. discloses an integrated process for the individual recovery of CO and $H_2$ from a gas mixture additionally containing $CO_2$, $CH_4$, and $N_2$ from a reformation reaction of a hydrocarbon feed stream, which features the removal of $CO_2$ from the gas mixture via selective adsorption with the primary gas being fed to downstream separation units. The $CO_2$-containing adsorbent is regenerated by purging with a $CO_2$-free gas stream originating from a downstream $H_2$ separation unit. The tail gas stream from the $CO_2$ adsorption unit is compressed and recycled to the syngas generation unit.

The related art provides examples of adsorption processes that effectively remove $H_2O$ and $CO_2$ from a raw syngas stream prior to cryogenic separation of the purified syngas. The syngas purification PSA processes described in the related art utilize valuable process gas streams, typically from downstream process units, for purging. As such, for the integrated process to be economically advantageous compared to conventional processes, compression and recycling of the PSA tail gas to the syngas generation unit feed is necessary. The PSA process of the present invention has been developed to simultaneously achieve high once-through and overall recovery of each of the primary components (i.e., $H_2$, CO, and $CH_4$) of the purified syngas product. Once-through recovery, $X_i$, is herein defined as the flow rate of each component in the product gas relative to the flow rate of each component in the feed gas and is expressed algebraically as:

Once-Though Recovery:

$$X_i[\%] = \frac{F_{Product} \cdot y^i_{Product}}{F_{Feed} \cdot y^i_{Feed}} \cdot 100\%$$

where:
i: gas component index (e.g., $H_2$, CO, $CH_4$)
$F_{Product}$: flow rate of the product gas
$F_{Feed}$: flow rate of the feed gas
$y^i_{Product}$: concentration of component i in the product gas
$y^i_{Feed}$: concentration of component i in the feed gas Analogously, overall recovery, $X_i$, herein defined as the flow rate of each component in the product gas relative to the total flow rate of each component introduced to the PSA process including both feed and purge streams and is expressed algebraically as:

Overall Recovery:

$$\overline{X_i}[\%] = \frac{F_{Product} \cdot y^i_{Product}}{F_{Feed} \cdot y^i_{Feed} + F_{Purge} \cdot y^i_{Purge}} \cdot 100\%$$

where:
i: gas component index (e.g., $H_2$, CO, $CH_4$)
$F_{Product}$: product gas flow rate
$F_{Feed}$: feed gas flow rate
$F_{Purge}$: purge gas flow rate
$y^i_{Product}$: concentration of component i in the product gas
$y^i_{Feed}$: concentration of component i in the feed gas
$y^i_{Purge}$: concentration of component i in the purge gas The present invention provides for a novel PSA process with simultaneous high once-through and overall recovery and an integrated process that achieves sufficiently high $H_2$ and CO recoveries such that compression and recycling of the syngas purification PSA tailgas is not necessary to be economically advantageous compared to the conventional processes.

SUMMARY OF THE INVENTION

An integrated process and a PSA process embodiment are disclosed herein.

The integrated process of the present invention provides for the individual recovery of at least a purified $H_2$-rich gas and a purified CO-rich gas from a hydrocarbon feedstock comprising:
  a. introducing a hydrocarbon feedstock into a syngas generation unit and generating a superatmospheric pressure syngas stream consisting essentially of at least $H_2$, CO, $CH_4$, $CO_2$, and $H_2O$);
  b. feeding the generated superatmospheric pressure syngas stream to a pressure swing adsorption (PSA)-based purification unit to produce a superatmospheric pressure syngas stream substantially free of $H_2O$ and $CO_2$;
  c. routing the superatmospheric pressure syngas stream substantially free of $H_2O$ and $CO_2$ to a separation system producing at least a $H_2$-rich stream and a CO-rich stream;
  d. wherein the PSA-based purification unit is purged with a high-purity $N_2$ stream for a first portion of a purge phase and with a $H_2$-containing gas substantially free of $H_2O$ and $CO_2$ for a second portion of the purge phase.

In addition, the present invention also provides a novel PSA process for purifying a super-atmospheric pressure syngas stream containing at least $H_2$, CO, $CO_2$, and $H_2O$ which includes introducing a super-atmospheric pressure syngas stream to a pressure swing adsorption (PSA) process system having a plurality of adsorbent-containing beds/vessels (adsorbers) that selectively remove substantially all $H_2O$ and $CO_2$ while discharging a super-atmospheric pressure syngas stream that is substantially free of $H_2O$ and $CO_2$, wherein the PSA process is purged with a high-purity $N_2$ stream substantially free of $H_2O$ and $CO_2$ for a first portion of the purge phase and with a $H_2$-containing gas stream substantially free of $H_2O$ and $CO_2$ for a second portion of the purge phase.

BRIEF DESCRIPTION OF THE DRAWINGS

The objects and advantages of the invention will be better understood from the following detailed description of the preferred embodiments thereof in connection with the accompanying figure wherein like numbers denote same features throughout and wherein.

DETAILED DESCRIPTION OF THE INVENTION

Two aspects of the present invention, namely an integrated process and the PSA process, are disclosed herein. In accordance with a first aspect, the recovery of a purified $H_2$-rich gas and a purified CO-rich gas from a syngas mixture containing at least $H_2$, CO, $CH_4$, $CO_2$, and $H_2O$ is effected by an integrated process including a PSA-based purification process unit for the selective removal of $H_2O$ and $CO_2$ to obtain a syngas mixture substantially free of $H_2O$ and $CO_2$ followed by a separation system for the recovery of at least a $H_2$-rich gas and a CO-rich gas, wherein adsorbed $H_2O$ and $CO_2$ are purged from the PSA-based purification process unit using a high-purity $N_2$ stream for a first portion of the PSA cycle purge phase and with a $H_2$-containing gas substantially free of H₂O and CO₂ for a second portion of the purge phase. According to the second aspect, a novel PSA cycle is disclosed for the substantial removal of $H_2O$ and $CO_2$ from a synthesis gas containing at least $H_2$, CO, $CO_2$ and $H_2O$ to obtain a multicomponent product gas substantially free of $H_2O$ and $CO_2$, wherein the PSA process is purged at a bottom pressure, typically slightly above atmospheric pressure (e.g., 1.3 bara), with $N_2$ substantially free of $H_2O$ and $CO_2$ for a first portion of the PSA cycle purge phase and with a $H_2$-containing gas substantially free of $H_2O$ and $CO_2$ for a second portion of the purge phase. The invented PSA process achieves sufficiently high overall recovery, typically in excess of 80%, preferably in excess of 90%, and more preferably in excess of 95%, of the synthesis gas components, specifically $H_2$, CO, and $CH_4$, such that the integrated process of the present invention is economically advantageous compared to the conventional integrated processes disclosed in the related art.

Figure 1:
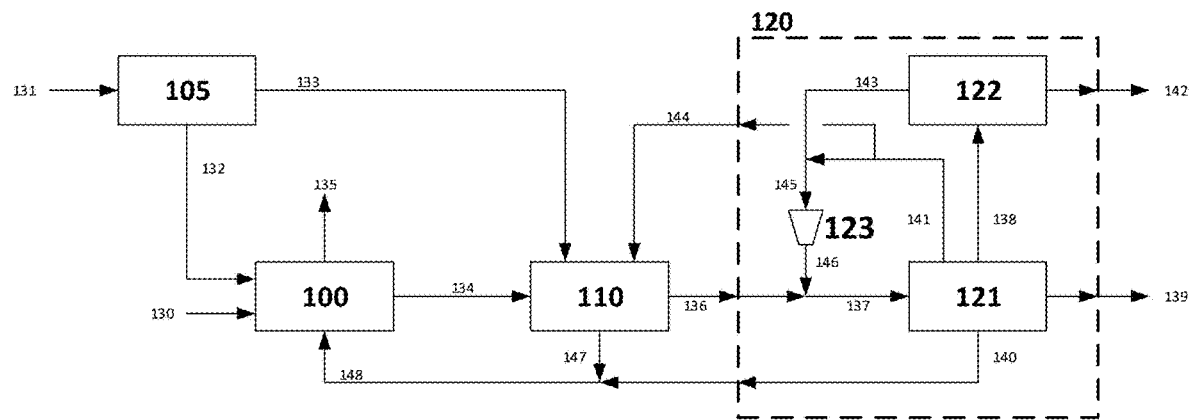
FIG. 1 illustrates an exemplary embodiment of the integrated purification system for producing purified $H_2$- and CO-rich gases.

A preferred embodiment of the invented integrated process is illustrated in FIG. 1. The integrated process for the individual recovery of at least a purified $H_2$-rich gas (142) and purified a CO-rich gas (139) from a hydrocarbon feedstock (130) includes:

a. introducing a hydrocarbon feedstock (130) into syngas generation unit (SGU) (100) and producing a superatmospheric pressure syngas (134) consisting of at least $H_2$, CO, $CH_4$, $CO_2$, and $H_2O$;

b. feeding the superatmospheric pressure syngas (134) to a PSA-based purification process unit (110) to obtain a superatmospheric pressure syngas substantially free of $H_2O$ and $CO_2$ (136);

c. routing the superatmospheric pressure syngas substantially free of $H_2O$ and $CO_2$ (136) to a separation system (120) to obtain at least a $H_2$-rich gas (142) and a CO-rich gas (139);

d. wherein the PSA-based purification process unit (110) is purged with a high-purity $N_2$ gas (133) for a first portion of the PSA cycle purge phase and with a $H_2$-containing gas substantially free of $H_2O$ and $CO_2$ (144) for a second portion of the purge phase.

A detailed description of the integrated process of the present invention will be provided. As shown in FIG. 1, a hydrocarbon feedstock (130) typically rich in $CH_4$, such as natural gas (NG), is fed in combination with purified $O_2$ (132) from a cryogenic air separation unit (105) to a syngas generation unit/system (100) to produce a synthesis gas mixture consisting of at least $H_2$, CO, $CH_4$, $CO_2$, and $H_2O$ (134). This syngas generation unit can be selected from a steam methane reformer, autothermal reformer or a partial oxidation reactor. The air separation units (105) effectively separates air (131) to generate a purified oxygen ($O_2$) stream (132), typically having a purity of 99+% with $N_2$ and Ar being the primary impurities. A purified nitrogen ($N_2$) gas (133), typically having a purity of 99.9+% is concomitantly produced. In the present embodiment, the syngas generation system includes an autothermal reformer unit and it is understood to include numerous process units/process equipment such as feedstock preheaters, hydrocarbon feedstock desulfurization, catalytic autothermal reactor, steam generation system, steam injection to reactor feed, and process gas coolers and condensate knockout. The produced synthesis gas (134) exits the syngas generation system (100) in the gaseous phase at superatmospheric pressure, near ambient temperature, and saturated with $H_2O$. Stream 134 is then fed to a PSA-based purification process unit (110) wherein the $H_2O$ and $CO_2$ content of 134 are selectively adsorbed in the adsorbent beds and the unadsorbed portion, a syngas mixture substantially free of $H_2O$ and $CO_2$ (136), is obtained and directed to the separation system (120). The separation system (120) of this exemplary embodiment includes a cryogenic separation unit (121), a second PSA unit (122), and a recycle compressor (123). The syngas mixture substantially free of $H_2O$ and $CO_2$ (136) is first fed to the cryogenic separation unit (121) to obtain a superatmospheric pressure $H_2$-rich gas (138), a purified CO-rich product gas (139), a $CH_4$-rich gas (140), and a low-pressure syngas (141). Superatmospheric pressure $H_2$-rich gas (138) is fed to the second PSA unit (122), commonly known in the field as a $H_2$ PSA, for the selective removal of the non-hydrogen components to yield a purified $H_2$-rich gas (142) having a $H_2$ purity of 99.99+%. The adsorbed components are rejected at a low pressure in the PSA cycle, typically slightly above atmospheric pressure (e.g., 1.3 bara), as a tailgas (143). In the current embodiment, the tail gas (143) and a portion of the low-pressure syngas (141) are combined to form a blended syngas (145), commonly referred to as an offgas, that is compressed via (123) to form a superatmospheric pressure syngas (146) that is blended with 136 to form the syngas feed (137) to the cryogenic separation unit (121). The $H_2O$- and $CO_2$-laden adsorbent beds of 110 are regenerated by purging with high-purity $N_2$ (133) for a first portion of the PSA cycle purge phase and with a $H_2$-containing gas substantially free of $H_2O$ and $CO_2$ (144) for a second portion of the purge phase. The waste gas (147), comprised of the desorbed $H_2O$ and $CO_2$ in addition to the desorbed syngas and the purge gas contents, is blended with stream 140 to form a fuel gas stream (148) that is utilized in (100) in the heating of process gas streams or in the generation of steam for export (135).

The temperature, pressure, and molar flow rates for key streams in the herein above described embodiment are provided in Table 1. In the current exemplary embodiment, the PSA-based purification process has a total purge-to-feed volume ratio of 0.1067, wherein the quantity of $N_2$ (133) utilized during the first portion of the purge phase makes up 75% of the total purge gas and the remaining 25% is comprised of the $H_2$-containing gas substantially free of $H_2O$ and $CO_2$ stream (144) used during the second portion of the purge phase. The purge-to-feed volume ratio is herein defined as the total volume of purge gas utilized per cycle to the total volume of feed gas processed.

TABLE 1

| Stream | 130 | 134 | 136 | 139 | 140 | 142 | 133 | 144 | 147 |
|---|---|---|---|---|---|---|---|---|---|
| Temp. [° C.] | 20.0 | 37.8 | 37.8 | 37.8 | 34.3 | 40.0 | 36.9 | 34.2 | 33.9 |
| Press. [bara] | 42.4 | 30.4 | 29.7 | 14.0 | 1.4 | 28.3 | 1.4 | 1.6 | 1.4 |
| Molar Flow Rate [kmol/h] | | | | | | | | | |
| Total | 616.9 | 1868.1 | 1720.5 | 456.3 | 23.9 | 1190.1 | 149.8 | 50.0 | 347.4 |
| $CH_4$ | 593.6 | 24.9 | 22.1 | 0.0 | 22.0 | 0.0 | 0.0 | 0.1 | 2.9 |
| $C_2H_6$ | 10.9 | 0.0 | 0.0 | 0.0 | 0.0 | 0.0 | 0.0 | 0.0 | 0.0 |
| $C_3^+$ | 3.5 | 0.0 | 0.0 | 0.0 | 0.0 | 0.0 | 0.0 | 0.0 | 0.0 |

TABLE 1-continued

| Stream | 130 | 134 | 136 | 139 | 140 | 142 | 133 | 144 | 147 |
|---|---|---|---|---|---|---|---|---|---|
| $N_2$ | 6.0 | 5.9 | 6.5 | 6.0 | 0.0 | 0.1 | 149.8 | 0.5 | 149.7 |
| $H_2$ | 0.0 | 1229.5 | 1218.0 | 0.0 | 0.0 | 1190.0 | 0.0 | 28.1 | 39.5 |
| CO | 0.0 | 494.4 | 472.9 | 449.5 | 1.9 | 0.0 | 0.0 | 21.3 | 42.8 |
| $CO_2$ | 2.9 | 112.4 | 0.0 | 0.0 | 0.0 | 0.0 | 0.0 | 0.0 | 112.4 |
| Ar | 0.0 | 1.0 | 0.9 | 0.9 | 0.0 | 0.0 | 0.0 | 0.0 | 0.1 |
| $H_2O$ | 0.0 | 0.0 | 0.0 | 0.0 | 0.0 | 0.0 | 0.0 | 0.0 | 0.0 |

The once-through and overall recoveries of the PSA-based purification process unit (110) are summarized in Table 2 for each syngas component in superatmospheric pressure syngas stream (136). The once-through and overall recoveries were calculated using the formulas provided herein above. The once-through recovery of $H_2$, CO, and $CH_4$ for the current embodiment are 99.1%, 95.7%, and 88.7% respectively and the overall recovery of $H_2$, CO, and $CH_4$ are 96.9%, 91.7%, and 88.5% respectively. As expected, the overall recoveries are less than the once-through recoveries as the prior accounts for the quantity of $H_2$, CO, and $CH_4$ utilized for purging. As the quantity of $H_2O$- and $CO_2$-free gas required for purging is essentially independent of composition, using a purge gas with lower or no syngas content (i.e., $H_2$, CO, $CH_4$), even for a portion of the purge phase, improves the overall recovery compared to the 'related art' processes. As herein described above, the 'related art' processes exclusively utilize a syngas stream typically originating from the syngas separation unit (120) for purging. To illustrate the benefit of the invented integrated process, the overall recoveries for $H_2$, CO, and $CH_4$ were calculated for a 'related art' process in which the PSA-based purification process (110) was purged using the same purge-to-feed ratio as in the present inventive process but using only syngas having the same composition as stream (144). Results are provided in Table 2, below. The once-through recoveries of $H_2$, CO and $CH_4$ are the same for both the present and 'related art' processes, however, the overall recoveries for $H_2$, CO, and $CH_4$ are reduced by 6.1, 10.1, and 9.6 points higher for the present process, respectively. This represents a significant improvement in recovery and, as such, the resulting waste gas stream (147) does not need to be compressed and recycled to the syngas generation system (100) feed stream as described in the 'related art' to be economically competitive with conventional integrated processes. Further, compression and recycling of the PSA waste gas stream (147) is required for the 'related art' processes as the quantity and heating value of the waste gas exceeds that required by all heaters in the syngas generation system (100) and, therefore, the waste gas cannot be beneficially utilized for heating purposes within the integrated process. The present inventive process, however, exhibits sufficiently high recoveries that compression and recycling of blended syngas stream (145) is not required and the quantity and heating value of the waste gas are such that it can be used beneficially within the syngas generation system (100) for heating purposes.

TABLE 2

| | Once-through | Overall Recovery | |
|---|---|---|---|
| | Recovery | Invented Process | Related Art |
| $H_2$ | 99.1 | 96.9 | 90.8 |
| CO | 95.7 | 91.7 | 81.6 |
| $CH_4$ | 88.7 | 88.5 | 78.9 |

Figure 2:
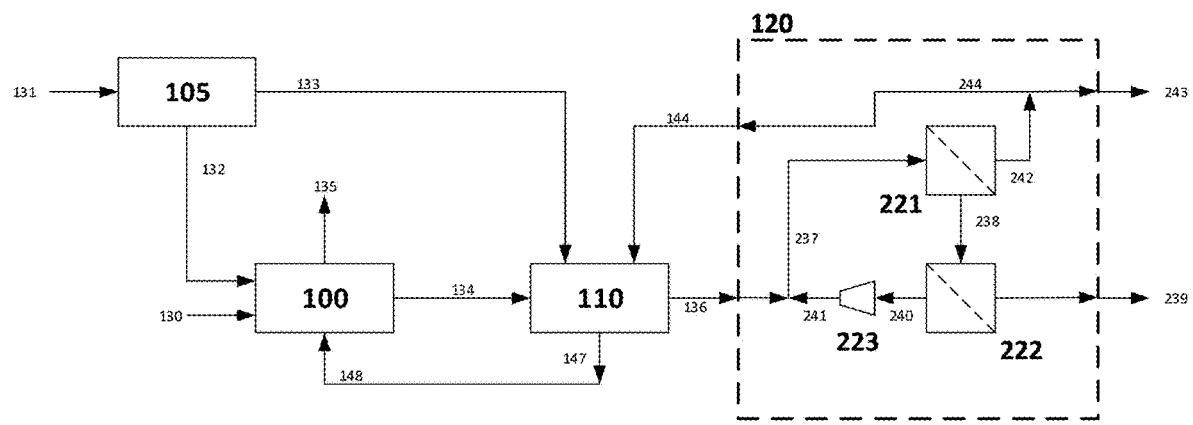
FIG. 2 illustrates another exemplary embodiment of the integrated purification system for producing purified $H_2$- and CO-rich gases.

An additional preferred embodiment of the integrated process of the present invention is illustrated in FIG. 2 in which the separation system (120) consists of a series of membrane modules for the recovery of a purified $H_2$-rich gas (243) and a purified CO-rich gas (239). Due to the similarity with the above described embodiment illustrated in FIG. 1, only the aspect unique to the integrated process of the current embodiment, specifically the separation system will be described. Produced synthesis gas (134) exits the syngas generation system (100) in the gaseous phase at superatmospheric pressure, near ambient temperature, and saturated with $H_2O$. Stream (134) is then fed to a PSA-based purification process unit (110) wherein the $H_2O$ and $CO_2$ content of 134 are selectively adsorbed in the adsorbent beds and the unadsorbed portion, a syngas mixture substantially free of $H_2O$ and $CO_2$ (136), is obtained and directed to the separation system (120). The separation system (120) of this exemplary embodiment includes a first membrane separation unit (221), a second membrane separation unit (222), and a recycle compressor (223). The syngas mixture substantially free of $H_2O$ and $CO_2$ (136) is fed to the first membrane unit (221) to obtain a $H_2$-rich permeate gas (242) at a pressure less than the pressure of the feed gas (237), and a CO-enriched syngas (238) as the retentate at a pressure similar to that of (237). The CO-enriched gas (238) is subsequently fed to a second membrane unit (222) to yield a second stage permeate gas (240) at a pressure less than the pressure of stream (238) and a purified CO-rich product gas (239) as the retentate at a pressure similar to that of (238). The second stage permeate gas (240) is recycled to the first membrane unit feed to improve the overall recovery of $H_2$ and CO. This is achieved by increasing the pressure of stream (240) via a recycle compressor (223) to yield a superatmospheric pressure syngas (241) that is blended with (136) to form the feed gas stream (237) to the first membrane unit (221). A portion of the $H_2$-rich permeate gas (242), stream (244), is routed to the PSA-based purification unit (110) via stream (144) and utilized for purging as it is a $H_2$-containing gas substantially free of $H_2O$ and $CO_2$ with the remaining portion, stream (243), forming the purified $H_2$-rich product gas. The $H_2O$- and $CO_2$-laden adsorbent beds of (110) are regenerated by purging with high-purity $N_2$ (133) for a first portion of the PSA cycle purge phase and with a $H_2$-containing gas substantially free of $H_2O$ and $CO_2$ (144) for a second portion of the purge phase. The waste gas (147), comprised of the desorbed $H_2O$ and $CO_2$ in addition to the desorbed syngas and the purge gas contents is utilized in (100) in the heating of process gas streams or in the generation of steam for export (135). In a variation of this integrated process, the $H_2$-rich gas, stream 243, is combined with the waste gas, stream 147, to form a $H_2$-enriched fuel stream (148).

The present invention also includes an aspect including a PSA-based purification process for the substantial removal of $H_2O$ and $CO_2$ from a synthesis gas containing at least $H_2$, CO, $CO_2$ and $H_2O$ to obtain a syngas product substantially free of $H_2O$ and $CO_2$, wherein the PSA process is purged at a bottom pressure with $N_2$ substantially free of $H_2O$ and $CO_2$ for a first portion of the PSA cycle purge phase and with $H_2$-containing gas substantially free of $H_2O$ and $CO_2$ for a second portion of the purge phase. The present invention is particularly beneficial for improving the overall recovery of the synthesis gas components, specifically $H_2$, CO, and $CH_4$.

Desirably, the substantial removal of $H_2O$ and $CO_2$ from a syngas stream is affected by passing the stream at elevated pressure through a plurality of adsorbers containing a solid adsorbent selective for the adsorption of $H_2O$ and $CO_2$, to obtain as the unadsorbed effluent, a multicomponent product gas, as syngas, substantially free of $H_2O$ and $CO_2$. The inventive process includes subjecting each of the adsorbers to a PSA cycle including the elementary phases of adsorption, co-current depressurization, blowdown, purge, countercurrent repressurization, and final repressurization, wherein with the adsorbers are purged with high-purity $N_2$ substantially free of $H_2O$ and $CO_2$ for a first portion of the purge phase and with $H_2$-containing gas substantially free of $H_2O$ and $CO_2$ for a second portion of the purge phase.

As described herein above, PSA-based syngas purification processes described in the related art require compression and recycling of the tailgas to be economically advantageous compared to conventional purification processes which as described above typically include at least an aqueous amine-based $CO_2$ removal process unit and a TSA dryer process unit. The related art PSA process exhibits lower overall recoveries due to the use of syngas, either originating internally or externally to the PSA process, as the purge gas. The present inventive PSA process specifically aims to reduce syngas losses during the purge phase and thus improve overall recovery of the purified syngas product such that compression and recycling of the tailgas is not necessary to be economically advantageous compared to conventional purification processes. In a preferred exemplary embodiment of the invented PSA process, the purge phase is divided into two portions in which the adsorber is initially purged with high-purity $N_2$ substantially free of $H_2O$ and $CO_2$ for a first portion and with $H_2$-containing gas substantially free of $H_2O$ and $CO_2$ for a second portion. It is understood that each portion of the elementary purge phase may comprise multiple PSA cycle steps. That is, the purge phase may, for example, be comprised of four purge steps wherein high-purity $N_2$ is used as the purge gas for the first three purge steps and $H_2$-containing gas is used the purge gas for the fourth and final purge step. Utilizing high-purity $N_2$ substantially free of $H_2O$ and $CO_2$ for the first portion of the purge phase effectively purges contaminants from the adsorber while simultaneously, and beneficially, reducing the loss of syngas associated with this portion of the purge phase. High-purity $N_2$ has been identified as a particularly good purge gas for use in the first portion of the purge phase as it is typically available at an adequate pressure and in sufficient quantity at most industrial plants, is already present in the syngas and, therefore, is not considered a new contaminant, and is relatively low cost especially in comparison to syngas streams. Using $N_2$ to purge the adsorber has the benefit of reducing syngas losses, however, it must also be purged or displaced from the adsorber during the second portion of the purge phase so that the $N_2$ concentration in the product syngas is sufficiently low to meet purity specifications. In the process of the present invention, $H_2$-containing gas substantially free of $H_2O$ and $CO_2$ is used in the second portion of the purge phase to displace $N_2$ from the adsorbent bed/vessel. Examples of suitable $H_2$-containing gases include syngas originating from an adsorbent bed/vessel in the co-current depressurization phase within the inventive PSA process, a portion of the product syngas from the PSA process, a product gas originating from a downstream process unit such as a cryogenic separation unit, a membrane separation unit, or a $H_2$ PSA unit, or a combination of these gases.

Further, the use of high-purity $N_2$ gas for purging in the PSA process of the present invention has the additional benefit of providing the ability to control the amount of purge gas used without affecting the syngas production rate of the PSA process or of the integrated process as a whole. This effectively enables the ability to adjust the purge rate independently to improve purging the adsorber of contaminants without affecting the once-through or overall recovery of the PSA process and therefore the production rate of the integrated process. In addition, the use of high-purity Na for purging further enables efficient adjustment in the plant rate, such as turndown, without requiring similar flexibility in all process units. Further, as the purpose of each of the purge phases in the inventive PSA process are different, the flow rate of each of the purge streams, specifically high-purity $N_2$ and $H_2$-containing gas, can be adjusted independently thus further providing better control and optimization of the once-though and overall recovery and the cost of operating the process.

Figure 3:
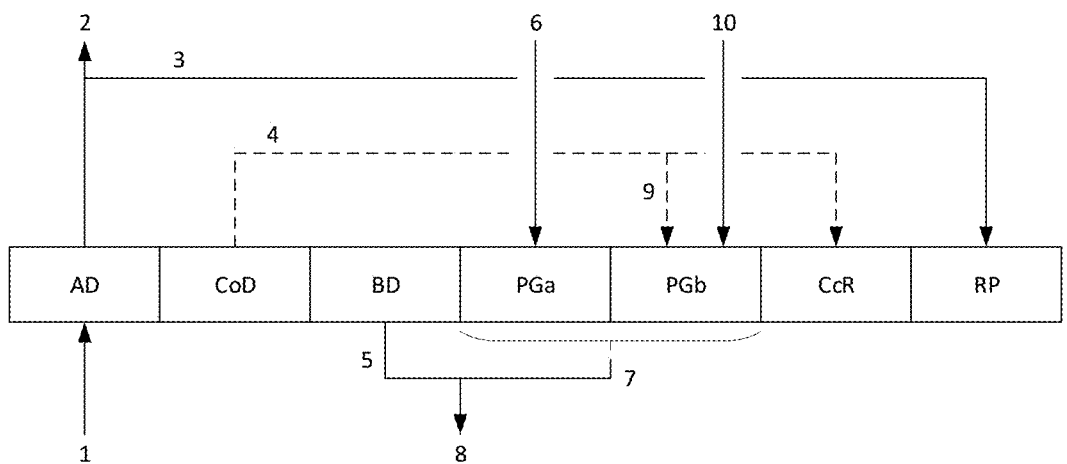
FIG. 3 is a schematic representation of the PSA cycle for a single adsorbent bed/vessel showing the flow of gas for each of the elementary phases in the PSA cycle of the present invention.

The novel PSA process of the present invention will now be described with reference to various exemplary embodiments. In the preferred embodiment of the invented PSA process, the process comprises subjecting a plurality of adsorbent beds/vessels to a repeating PSA cycle comprising the elementary phases of adsorption (AD), cocurrent depressurization (CoD), blowdown (BD), purge (PG), countercurrent repressurization (CcR), and final repressurization (RP), wherein the adsorber is purged with high-purity Na substantially free of $H_2O$ and $CO_2$ for a first portion of the purge phase (PGa) and with $H_2$-containing gas substantially free of $H_2O$ and $CO_2$ for a second portion of the purge phase (PGb). A schematic representation of the PSA cycle for a single adsorbent bed/vessel showing the flow of gas for each of the elementary phases in the invented PSA cycle is illustrated in FIG. 3. It is understood that the elementary phases of the PSA cycle may include multiple steps of the same type. For example, the adsorption (AD) phase may comprise one or more adsorption steps (e.g., AD1, AD2, AD3, etc.). The PSA cycle commences with the exemplary adsorbent bed/vessel in the adsorption (AD) phase. A syngas feed stream (1) is introduced to the bottom of the adsorbent bed/vessel at an elevated pressure. The syngas feed stream flows from the bottom of the adsorber to the top. This upward flow direction in the adsorbent bed/vessel will be referred to as co-current with respect to the feed gas. During the adsorption phase, substantially all $H_2O$ and $CO_2$ in the feed gas are adsorbed on to the adsorbent bed within the vessel and a multicomponent product gas, a syngas, substantially free of $H_2O$ and $CO_2$ (2) is obtained. The cycle is advanced to the next phase and the adsorbent bed/vessel enters the co-current depressurization (CoD) phase in which gas is transferred from the top of the exemplary adsorbent bed/vessel in the co-current direction into the top of a lower-pressure adsorbent bed/vessel in the purge (PG) or countercurrent repressurization (CcR) phases. The co-current depressurization (CoD) phase may be comprised of multiple bed/vessel-to-bed/vessel equalization steps and provide purge gag steps in which gas is transferred via at least one conduit (4) to other adsorbent bed/vessel at lower pressure that are progressing through the purge (PG) or countercurrent repressurization (CcR) phases. After completing the co-current depressurization (CoD) phase, the adsorbent bed/vessel proceeds to the blowdown (BD) phase. The purpose of the blowdown phase, also commonly known as the countercurrent depressurization phase, is to rid the adsorbent bed/vessel of impurities removed from the syngas feed gas through the bottom of the adsorbent bed/vessel as blowdown gas (5). During the blowdown phase, the adsorbent bed/vessel pressure decreases from the final pressure of the co-current depressurization (CoD) phase to the low or bottom pressure of the PSA cycle. The bottom pressure of the PSA cycle is typically near atmospheric pressure, for example 1.3 bara, but can range between about 1.0 bara and 4.5 bara depending on the application. The cycle subsequently progresses to the purge (PGa & PGb) phase. In the purge phase, the adsorbent bed/vessel is swept with a purge gas introduced at the top of the adsorbent bed/vessel flowing counter currently to the direction of the feed gas to expel contaminants out the bottom of the adsorbent bed/vessel at or near the bottom pressure of the PSA cycle as expelled gas (7). The purge phase is also commonly known as countercurrent elution. The expelled gas (7) can be combined with the blowdown gas (5) via a shared conduit (8) and routed to a vessel, commonly known as a blowdown or tail gas drum (not shown). In the inventive process, the adsorbent bed/vessel is purged with high-purity Na substantially free of $H_2O$ and $CO_2$ (6) for a first portion of the purge phase (PGa) and with $H_2$-containing gas substantially free of $H_2O$ and $CO_2$ (9 and/or 10) for a second portion (PGb). The $H_2$-containing purge gas may originate internally to the PSA process from the co-current depressurization (CoD) phase of the cycle, for example, from a provide purge gas step via conduit (9). Further, the $H_2$-containing purge gas may originate externally to the PSA process via conduit (10) with the requirement that the gas be substantially free of $CO_2$ and $H_2O$. With the completion of the purge phase, the cycle progresses to the countercurrent repressurization (CcR) phase in which the adsorber undergoes a series of bed-to-bed repressurization steps. In the countercurrent repressurization (CcR) phase, the adsorber receives gas from an adsorber at a higher pressure in the cocurrent depressurization (CoD) phase via at least one conduit (4). With the completion of the countercurrent repressurization equalization phase, the cycle progresses to the final pressurization (RP) phase. The adsorbent bed/vessel pressure is increased from the pressure at the end of the CcR phase to near the top pressure of the PSA cycle using either a portion of the product gas (3) introduced to the top of the adsorber as shown in FIG. 3 or, optionally, a portion of the feed gas that is introduced to the bottom of the adsorbent bed/vessel flowing in the co-current direction (not shown). With the completion of the PSA cycle, the adsorber is ready to return to the adsorption (AD) phase and repeat the cycle.

It is understood that the PSA process includes a plurality of adsorbent bed/vessel progressing through the PSA cycle and that the PSA cycle is designed such that at least one adsorbent bed/vessel is in the adsorption phase to process feed gas and at least one adsorber is in the purge phase at all instances within the PSA cycle.

Desirably, the presently invented PSA process features the ability to adjust the purge-to-feed volume ratio, herein defined as the volume of purge gas utilized to the volume of feed gas processed. Of particular importance is the ability to adjust the purge-to-feed volume ratio for the PGa step in which high-purity $N_2$ is utilized as the purge gas without affecting the once-through or overall recovery of the invented PSA process or the integrated process as a whole. The PSA process of the present invention has the benefit of additional degrees of freedom in terms of the quantity of purge gas available (purge-to-feed volume ratio) as it does not exclusively originate internally to the PSA process performance and therefore the purge-to-feed volume ratio can be adjusted without modification to the PSA process or pressure profile. Increasing the purge-to-feed volume ratio has the benefit of shorter adsorbent bed/vessel or longer step times for the same feed rate and can, therefore, enable higher recoveries. Increasing the purge-to-feed volume ratio ultimately results in superior contaminant removal, however, there are limitations to the quantity of purge gas that can be effectively utilized. First, there may be a limitation in the availability of the purge gas, second, utilizing a large flow rate may results in an increased pressure drop across the adsorbent bed/vessel which can have a detrimental effect on the removal of contaminants from the adsorbent bed/vessel, and third, the operating cost of the purge gas.

Figure 4:
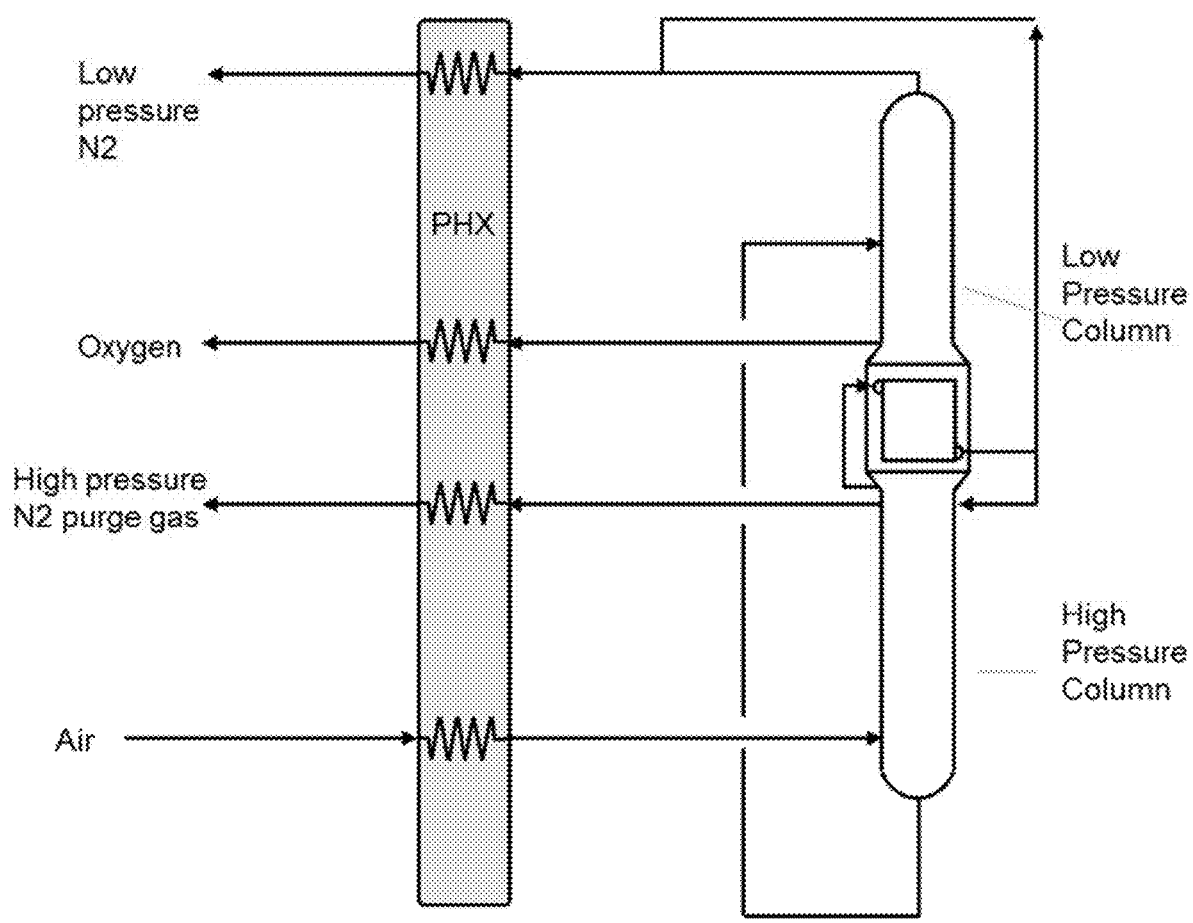
FIG. 4 is a schematic representation of a cryogenic air separation unit showing a preferred source of high purity nitrogen purge gas.

To minimize operating cost of high purity $N_2$ purge gas, it is necessary to integrate nitrogen supply from the air separation unit appropriately. FIG. 4 depicts a simplified schematic diagram of a cryogenic air separation unit (ASU) well known in the art. Briefly, compressed purified air is cooled in a primary heat exchanger (PHX) to cryogenic temperature and fed to the high-pressure column and fractionated into high purity nitrogen and oxygen-rich air, both at close to pressure at which air is supplied at. Both these streams are fed to the low-pressure column to produce oxygen and nitrogen streams at low pressure. Both these streams are warmed against feed air in the PHX. If a portion of this low-pressure nitrogen is sourced as purge gas for the PSA process, a compressor will be needed prior to feeding the PSA unit. This will add capital and operating costs for purge gas supply. To minimize these additional costs, nitrogen necessary for purging the PSA of the present invention is extracted from high pressure column and it is supplied as purge gas after warming it separately in the PHX.

EXAMPLES

The present invention will be more thoroughly described with the assistance of a set of exemplary embodiments. The performance of the PSA processes described in the subsequent examples were obtained via a detailed adsorption model, based upon the governing material and energy balances involved in the process. Flow in the adsorption model was described by the axial dispersed plug flow model. Additional characteristics of the model include bed pressure drop, multicomponent isotherm (as determined by the loading ratio correlation), adiabatic energy balance, and adsorption rate (as determined by the linear driving force). The simulation results were found to agree well with pilot scale experimental process performance results.

Comparative Example 1

Figure 5:
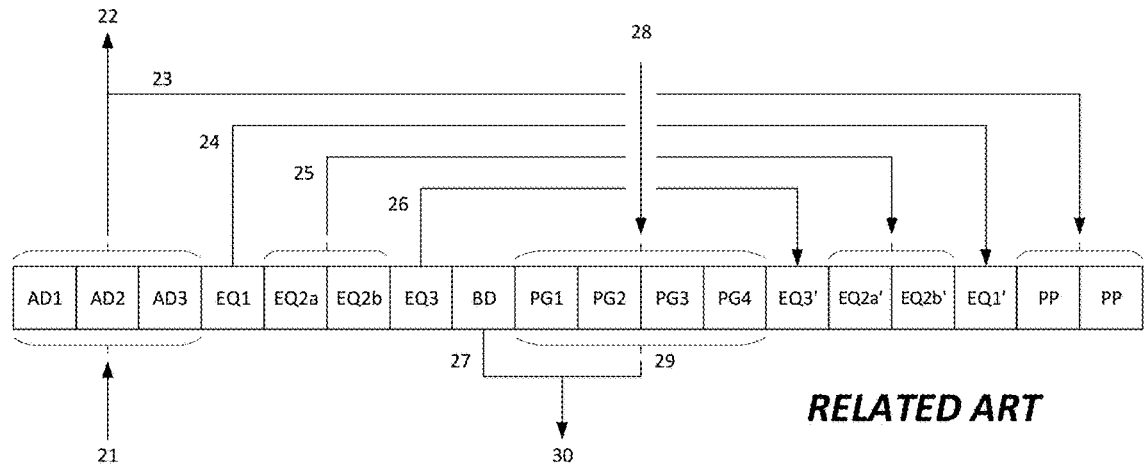
FIG. 5 is a schematic representation of a single adsorbent bed/vessel (i.e., Bed A) progressing through the complete PSA cycle of the related art.
Figure 6:
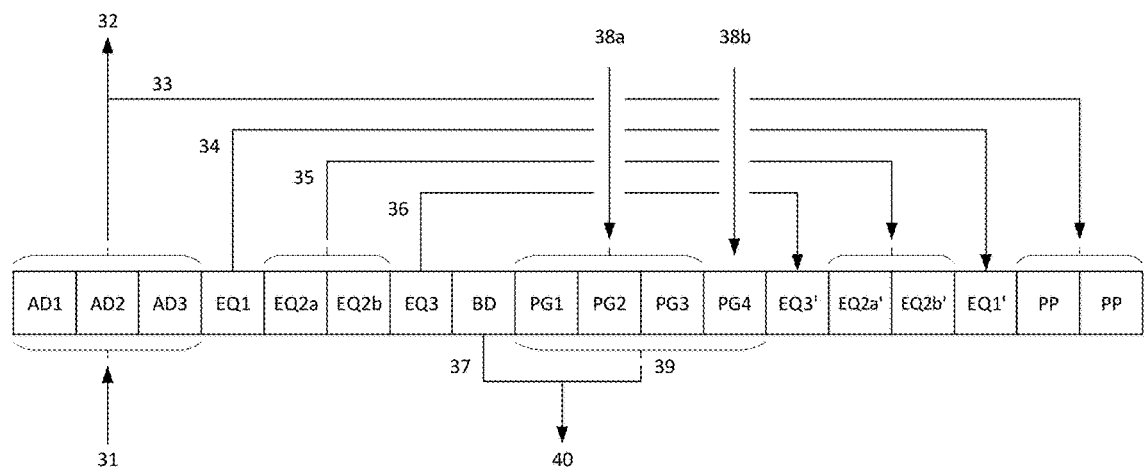
FIG. 6 is a schematic representation of a single adsorbent bed/vessel (i.e., Bed A) progressing through the complete PSA cycle of the present invention.

An exemplary embodiment of the inventive PSA process is described herein to illustrate the benefit of partitioning the purge phase into two portions in which high-purity $N_2$ substantially free of $H_2O$ and $CO_2$ is utilized for a first portion of the purge phase and $H_2$-containing gas substantially free of $H_2O$ and $CO_2$ is utilized for a second portion of the purge phase. The performance of two PSA processes employing the same 6-1-3 PSA cycle, are depicted in Table 3, and employed to illustrate the superior overall recovery of the present PSA process. The nomenclature utilized herein to refer to a PSA cycle, and by way of example in a 6-1-3 cycle, the first number refers to the number of adsorbent beds/vessels in the PSA system, the second number refers to the number of adsorbent beds in parallel feed (i.e., at any instant processing feed), and the last number refers to the number of adsorbent bed-to-bed equalization steps. The first PSA process of the current example, referred to hereafter as the 'related art' PSA process, utilizes a syngas stream originating externally from the PSA process for purging the adsorbent bed/vessels as described in the related art (e.g., U.S. Pat. Nos. 4,732,592, 5,073,356) while the second PSA process of the current example incorporates the features of the present invention, specifically the use of high-purity $N_2$ substantially free of $H_2O$ and $CO_2$ for a first portion of the purge phase and $H_2$-containing gas substantially free of $H_2O$ and $CO_2$ for a second portion of the purge phase. In Table 3, the rows correspond to a particular adsorbent bed in the PSA process, while the columns represent the step number. The sequence of steps is performed in the order recited for each of the adsorbers in turn. The PSA cycle sequence illustrated in Table 3 is comprised of six adsorbent beds/vessels (i.e., A, B, C, D, E, F) with one adsorbent bed/vessel processing feed gas at all times, three bed-to-bed equalization steps, and a purge gas originating externally from the PSA process. Schematic representations of a single adsorbent bed/vessel (i.e., Bed A) progressing through the complete PSA cycle showing the flow of gas are provided in FIG. 5 for the 'related art' PSA process and in FIG. 6 for the invented PSA process. Comparing the schematic representations, it is clear that the primary difference between the two PSA processes is the source of purge gas. In the 'related art' PSA process (FIG. 5), the purge gas (28) is a $H_2$-containing gas substantially free of $H_2O$ and $CO_2$ that originates external to the PSA process that is used for all steps in the purge phase (i.e., PG1, PG2, PG3, PG4). By comparison, in the PSA process of the present invention, two purge gases originating externally to the PSA process are used for the purging. A high-purity $N_2$ gas substantially free of $H_2O$ and $CO_2$ (38a) is utilized for a first portion of the purge phase (i.e., PG1, PG2, PG3) and a $H_2$-containing gas substantially free of $H_2O$ and $CO_2$ (38b) is utilized for a second portion of the purge phase (i.e., PG4).

A step-by-step description of the PSA cycle with reference to both the 'related art' and invented PSA processes is provided below:

Steps 1-3: A syngas feed stream (21, 31) is introduced to the bottom of Bed A from the Feed header at high pressure. The $H_2O$ and $CO_2$-containing syngas feed gas flows from the bottom to the top of adsorbent Bed A. This upward flow direction will be referred to as co-current flow with respect to feed. During the adsorption step, substantially all $H_2O$ and $CO_2$ are adsorbed on to the adsorbent bed/vessel and a syngas product gas substantially free of $H_2O$ and $CO_2$ is obtained (22, 32). Bed A remains in the adsorption step for steps one, two, and three (i.e., AD1, AD2, AD3).

Step 4: Bed A progresses to the first bed-to-bed equalization step (EQ1) and transfers equalization gas to a lower pressure adsorption bed/vessel—Bed C—in step (EQ1') via conduit (24, 34). The pressures of both beds are approximately equal at the end of this step.

Step 5 & 6: The cycle step progresses and adsorption Bed A undergoes the second equalization step (EQ2a, EQ2b) and transfers equalization gas to a lower pressure adsorber—Bed D—in step (EQ2a', EQ2b') via conduit (25, 35). The pressures of both beds are approximately equal at the end of this step.

Step 7: The cycle step progresses and Bed A undergoes the third equalization step (EQ3) and transfers equalization gas to a lower pressure adsorption—Bed E—in step (EQ3') via conduit (26, 36). The pressures of both beds are approximately equal at the end of this step.

Step 8: Adsorption Bed A then proceeds to blowdown (BD). The purpose of this step is to expel impurities adsorbed during co-current steps (AD, EQ) from the adsorbent bed through the bottom of the adsorber via conduit (27, 37). As a result, contaminants are desorbed and counter-currently directed to a shared waste gas header (30, 40).

Steps 9, 10, 11, & 12: Bed A subsequently progresses to the purge phase. In the 'related art' PSA process, a $H_2$-containing gas substantially free of $H_2O$ and $CO_2$ originating externally from the PSA process is used as the purge gas (28) for the entire purge phase including steps PG1, PG2, PG3, and PG4. On the other hand, in the PSA process of the present invention, a high-purity $N_2$ stream substantially free of $H_2O$ and $CO_2$ (38a) is utilized for a first portion of the purge phase (i.e., PG1, PG2, PG3) and a $H_2$-containing gas substantially free of $H_2O$ and $CO_2$ (38b) is utilized for a second portion of the purge phase (i.e., PG4). Purge gas is introduced to the top of adsorbent Bed A and flows counter-current to the direction of the feed gas. The purge gas, being substantially free of $H_2O$ and $CO_2$, sweeps the contaminants from the adsorber through the bottom of the adsorbent bed/vessel via conduit (29, 39). As a result, contaminants are desorbed and counter-currently directed to a shared waste gas header (30, 40).

TABLE 3

| Adsorber | STEP # | | | | | | | | | |
|---|---|---|---|---|---|---|---|---|---|---|
| | 1 | 2 | 3 | 4 | 5 | 6 | 7 | 8 | 9 | 10 |
| A | AD1 | AD2 | AD3 | EQ1 | EQ2a | EQ2b | EQ3 | BD | PG1 | PG2 |
| B | EQ1' | PP | PP | AD1 | AD2 | AD3 | EQ1 | EQ2a | EQ2b | EQ3 |
| C | EQ3' | EQ2a' | EQ2b' | EQ1' | PP | PP | AD1 | AD2 | AD3 | EQ1 |
| D | PG2 | PG3 | PG4 | EQ3' | EQ2a' | EQ2b' | EQ1' | PP | PP | AD1 |
| E | EQ3 | BD | PG1 | PG2 | PG3 | PG4 | EQ3' | EQ2a' | EQ2b' | EQ1' |
| F | EQ1 | EQ2a | EQ2b | EQ3 | BD | PG1 | PG2 | PG3 | PG4 | EQ3' |

| Adsorber | STEP # | | | | | | | |
|---|---|---|---|---|---|---|---|---|
| | 11 | 12 | 13 | 14 | 15 | 16 | 17 | 18 |
| A | PG3 | PG4 | EQ3' | EQ2a' | EQ2b' | EQ1' | PP | PP |
| B | BD | PG1 | PG2 | PG3 | PG4 | EQ3' | EQ2a' | EQ2b' |
| C | EQ2a | EQ2b | EQ3 | BD | PG1 | PG2 | PG3 | PG4 |
| D | AD2 | AD3 | EQ1 | EQ2a | EQ2b | EQ3 | BD | PG1 |
| E | PP | PP | AD1 | AD2 | AD3 | EQ1 | EQ2a | EQ2b |
| F | EQ2a' | EQ2b' | EQ1' | PP | PP | AD1 | AD2 | AD3 |

Step 13: Adsorbent Bed A progresses to the first bed-to-bed repressurization equalization step (EQ3') and receives equalization gas from Bed C via conduit (26, 36). The adsorbent bed/vessel in (EQ3) and (EQ3') steps are interacting such that gas in Bed C is transferred to adsorbent Bed A until the pressures in both beds are equalized.

Step 14 & 15: Adsorbent Bed A progresses to the second bed-to-bed repressurization equalization step (EQ2a', EQ2b') and receives equalization gas from adsorbent Bed D via conduit (25, 35). The adsorbers in (EQ2a, EQ2b) and (EQ2a', EQ2b') steps are interacting such that gas in adsorbent Bed D is transferred to adsorbent Bed A until the pressures in both beds are equalized.

Step 16: Bed A progresses to the third bed-to-bed repressurization equalization step (EQ1') and receives equalization gas from Bed E via conduit (24, 34). The adsorbers in (EQ1) and (EQ1') steps are interacting such that gas in Bed E is transferred to Bed A until the pressures in both adsorbent beds/vessels are equalized.

Step 17 & 18: In the last two steps of the cycle, adsorbent Bed A progresses to the final repressurization (RP) steps. In this example, a portion of the product gas is employed to further raise the pressure in the adsorber to near the product pressure via conduit (23, 33).

With the completion of Step 18, adsorbent Bed A returns to Step 1 completing the cyclic process. The remaining beds (i.e., B, C, D, E, F) follow the above described cycle with a shift in the step sequence as illustrated in Table 3. In this exemplary 6-1-3 PSA cycle, each adsorber completes 3 AD steps and 4 PG steps every cycle and as such two purge steps, PG1 and PG4, overlap every third step (3, 6, 9, 12, 15, 18). In this example, the flow rate of the feed (21, 31) and purge (28, 38a) streams remain constant throughout the entire cycle. As such, in the 'related art' example, the purge gas is equally split between the respective adsorbent beds/vessels during the overlapping PG1 and PG4 steps while the adsorbent bed/vessel in the PG2 and PG3 steps receive the entirety of the purge gas. In contrast, in the PSA process of the present invention, the flow of high-purity $N_2$ (38a) used for PG1, PG2, and PG3 steps remains constant throughout the cycle, while the flow of the $H_2$-containing purge gas (38b) during the PG4 step is intermittently introduced.

Figure 7:
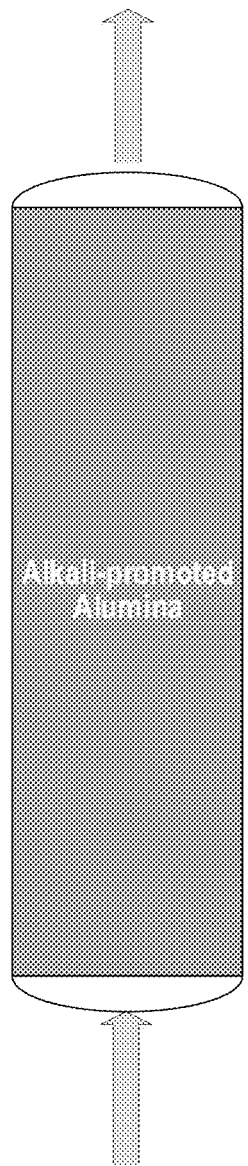
FIG. 7 illustrates an adsorbent bed/vessel containing a single layer of alkali-promoted alumina as described in Example 1.

Simulations of the two PSA processes—'Related Art' and the 'Present Invention'—were completed using the detailed adsorption model described herein above with the adsorbent bed/vessel containing a single layer of alkali-promoted alumina as illustrated in FIG. 7. For both PSA processes in this example, the $H_2$-containing gas used for purging originated externally from the PSA process, for example from a downstream separation system. The process conditions for the simulation are given in Table 4. The PSA process was operated with a 40 s step time giving a total cycle time of 720 s (18 steps). Both PSA processes were simulated having a purge-to-feed volume ratio of 0.133, where the purge-to-feed volume ratio is herein defined as the total volume of purge gas utilized per cycle to the total volume of feed gas processed.

TABLE 4

| Parameter | Value |
| --- | --- |
| Adsorbent | Alkali-promoted Alumina |
| Adsorber Dia [m] | 1.84 |
| Adsorbent Layer Height [m] | 3.66 |
| Feed Rate [kmol/h] | 1115.2 |
| Feed Pressure [bara] | 29.66 |

TABLE 4-continued

| Parameter | Value |
| --- | --- |
| Feed Temperature [K] | 314.9 |
| Feed Gas Comp. [%] | 63.52% $H_2$, 29.09% CO, 1.52% $CH_4$, 5.42% $CO_2$, 0.13% $N_2$, 0.33% $H_2O$ |
| Purge Rate [kmol/h] | |
| High-purity $N_2$ (38a) | 111.15 |
| $H_2$-containing gas (28; 38b) | 148.2; 37.05 |
| Purge Pressure [bara] | 1.3 |
| Purge Temperature [K] | 309.26 |
| Purge Gas Comp. [%] | |
| High-purity $N_2$ (38a) | 99.999+% $N_2$ |
| $H_2$-containing gas (28 & 38b) | 56.27% $H_2$, 43.32% CO, 0.18% $CH_4$, 0.23% $N_2$ |

Results from the simulation are summarized in Table 5 as once-through and overall recovery for each of the primary syngas components (i.e., $H_2$, CO, $CH_4$). The definition and algebraic expressions for the once-through and overall recovery are defined herein above. The once-through recovery for each of the primary syngas components is very similar for both the 'related art' and PSA processes of the present invention. This observation indicates that the type of purge gas, either $H_2$-containing gas only as in the 'related art' process or a sequential combination of high-purity $N_2$ followed by $H_2$-containing gas as shown in the present invention, has little effect on the product gas flow rate and composition. The PSA process of the present invention, however, exhibits significantly higher overall recovery of the primary syngas components and most desirably $H_2$ and CO. In fact, the overall recovery of $H_2$ and CO for the process of the present invention are 7.2 and 10.8 points greater respectively compared to the 'related art' process. In addition, although the $N_2$ impurity is marginally greater for the invented process compared to the 'related art' PSA process—0.132% compared to 0.130%—both PSA-based purification processes are more selective for CO than for $N_2$. As such, the CO/$N_2$ ratio, a metric indicative of the $N_2$ impurity in the CO-rich gas obtained from a hypothetical downstream separation process, is greater for the PSA-based processes–233.9 ('related art') vs 231.2 (present invention)–than the feed gas (223.5). Further, the conventional purification process, which as described above typically include at least an aqueous amine-based $CO_2$ removal process unit and a TSA dryer process unit, typically shows no difference in selectivity for CO and $N_2$ and therefore the CO/$N_2$ ratio of the purified syngas obtained from the convention purification process is essentially the same as the feed gas. $N_2$ is a primary impurity in the purified CO-rich product gas obtained from downstream separation processes and therefore, since the exemplary PSA-based purification processes are more selective for CO than $N_2$, the resulting CO-rich gas will have less $N_2$ impurity.

This example illustrates the benefit of the process of the present invention in improving the overall recovery of the primary syngas components by utilizing an inert gas, e.g., $N_2$, for purging during the first portion of the purge phase. Further, it illustrates that the utilization of a utility gas, such as high-purity $N_2$, does not result in the marked increase in impurities in the product syngas which could easily offset any economic benefit associated with improved recovery.

TABLE 5

| | Once-through Recovery [%] | | | Overall Recovery [%] | | | $N_2$ Impurity in Product Gas |
|---|---|---|---|---|---|---|---|
| | $H_2$ | CO | $CH_4$ | $H_2$ | CO | $CH_4$ | (22, 32) [%] |
| Related Art PSA Process | 93.9 | 91.8 | 87.2 | 84.0 | 76.6 | 85.9 | 0.130 |
| Present Invention PSA Process | 93.9 | 91.8 | 87.2 | 91.2 | 87.4 | 86.9 | 0.132 |

Example 2

Figure 8:
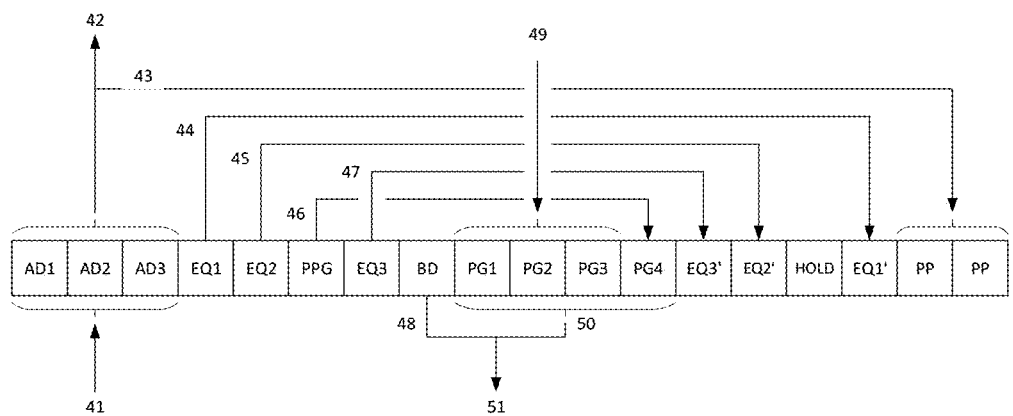
FIG. 8 is a schematic representation of a single adsorption bed/vessel (i.e., Bed A) progressing through the complete PSA cycle for the cycle shown in Table 6.
Figure 9:
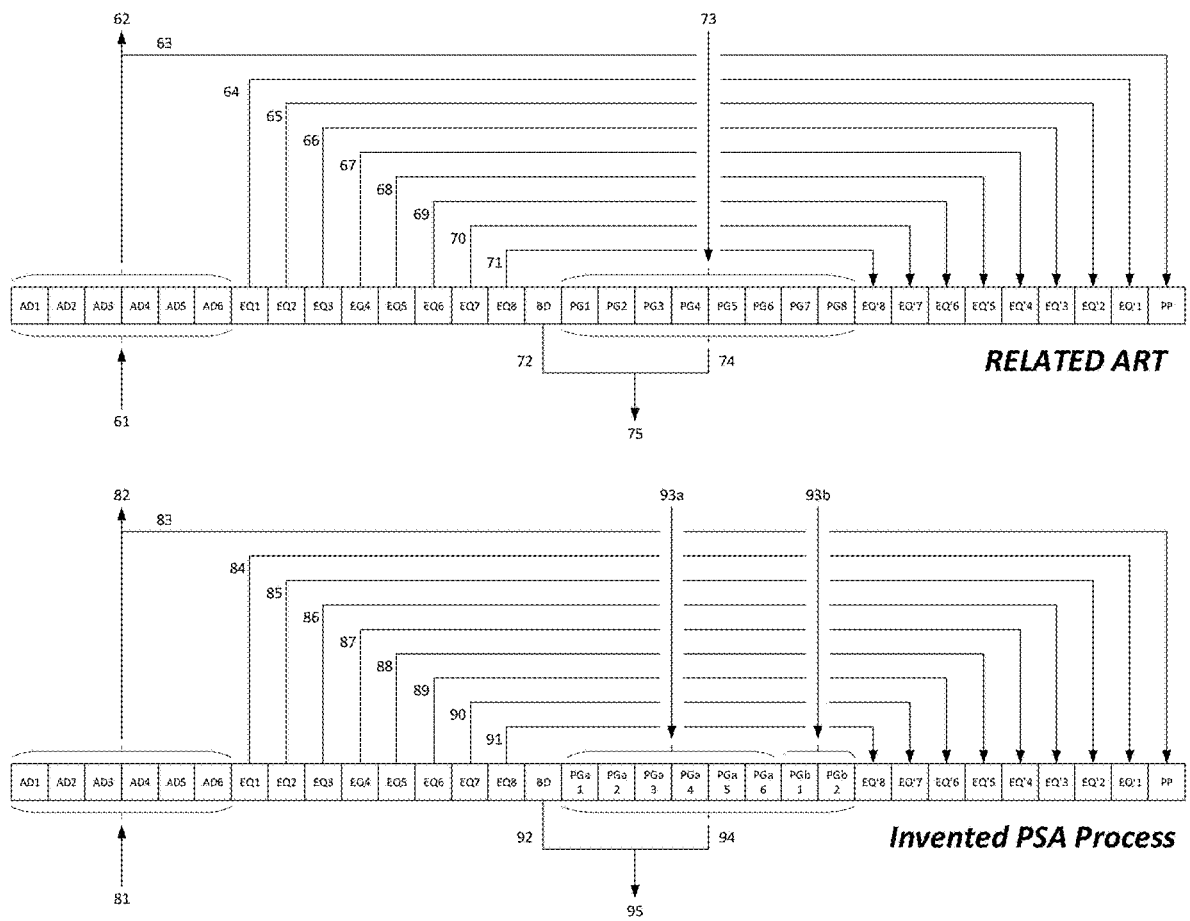
FIG. 9 and a schematic representation of a single adsorbent bed/vessel (i.e., Bed A) progressing through the complete PSA cycle showing the flow of gas for the cycle shown in Table 9, depicting both the related art and the inventive PSA cycle.

An additional embodiment of the present invention is the utilization of a $H_2$-containing stream for a second portion of the purge phase that originates internally to the PSA process. The benefit of such a PSA cycle is that the PSA process does not rely on a purified $H_2$-containing stream originating external to the PSA process, which is typically a product obtained from a downstream process unit. Utilizing an internally provided $H_2$-containing stream for purge simplifies operation of the PSA process o the present invention, particularly during startup and in the event of disturbances in the downstream processes. The PSA cycle of the current example, a 6-1-3 PSA cycle with the $H_2$-containing gas utilized for the second portion of the purge phase originating internally to the PSA process, is given in Table 6 and a schematic representation of a single adsorption bed/vessel (i.e., Bed A) progressing through the complete PSA cycle showing the flow of gas is provided in FIG. 8. The PSA cycle of the current example is very similar to that provided in Example 1 with the primary differences being: 1) replacement of the EQ2*b* step with a PPG step, 2) the addition of a conduit for passing purge gas from the adsorber in the PPG step to the adsorber in the PG4 step, and 3) replacement of the EQ2*b*' step with a HOLD step.

substantially all $H_2O$ and $CO_2$ are adsorbed on to the adsorbent bed/vessel and a syngas product substantially free of $H_2O$ and $CO_2$ is obtained (42). Adsorption Bed A remains in the adsorption step for steps one, two, and three (i.e., AD1, AD2, AD3) for the exemplary 6-1-3 cycle.

Step 4: Adsorption Bed A progresses to the first bed-to-bed equalization step (EQ1) and transfers equalization gas to a lower pressure adsorbent—Bed C—in step (EQ1') via conduit (44). The pressures of both adsorption beds/vessels are approximately equal at the end of this step.

Step 5: The cycle step progresses and Bed A undergoes the second equalization step (EQ2) and transfers equalization gas to a lower pressure adsorbent—Bed D—in step (EQ2') via conduit (45). The pressures of both adsorbent beds/vessels are approximately equal at the end of this step.

Step 6: Bed A completes the provide purge gas (PPG) step as part of the co-current depressurization (CoD) phase. Gas is transferred from the top of Bed A to the top of Bed E, which is in the PG4 step, via conduit (46). The adsorbent bed length has been designed such that the syngas being transferred during the PPG step is substantially free of $H_2O$ and $CO_2$ and therefore does not contaminate the product end of Bed E during the PG4 step. The pressure difference between the beginning and the end of the PPG step is set such that the

TABLE 6

| | STEP # | | | | | | | | | |
|---|---|---|---|---|---|---|---|---|---|---|
| Adsorber | 1 | 2 | 3 | 4 | 5 | 6 | 7 | 8 | 9 | 10 |
| A | AD1 | AD2 | AD3 | EQ1 | EQ2 | PPG | EQ3 | BD | PG1 | PG2 |
| B | EQ1' | PP | PP | AD1 | AD2 | AD3 | EQ1 | EQ2 | PPG | EQ3 |
| C | EQ3' | EQ2' | HOLD | EQ1' | PP | PP | AD1 | AD2 | AD3 | EQ1 |
| D | PG2 | PG3 | PG4 | EQ3' | EQ2' | HOLD | EQ1' | PP | PP | AD1 |
| E | EQ3 | BD | PG1 | PG2 | PG3 | PG4 | EQ3' | EQ2' | HOLD | EQ1' |
| F | EQ1 | EQ2 | PPG | EQ3 | BD | PG1 | PG2 | PG3 | PG4 | EQ3' |

| | STEP # | | | | | | | |
|---|---|---|---|---|---|---|---|---|
| Adsorber | 11 | 12 | 13 | 14 | 15 | 16 | 17 | 18 |
| A | PG3 | PG4 | EQ3' | EQ2' | HOLD | EQ1' | PP | PP |
| B | BD | PG1 | PG2 | PG3 | PG4 | EQ3' | EQ2' | HOLD |
| C | EQ2 | PPG | EQ3 | BD | PG1 | PG2 | PG3 | PG4 |
| D | AD2 | AD3 | EQ1 | EQ2 | PPG | EQ3 | BD | PG1 |
| E | PP | PP | AD1 | AD2 | AD3 | EQ1 | EQ2 | PPG |
| F | EQ2' | HOLD | EQ1' | PP | PP | AD1 | AD2 | AD3 |

Although the PSA cycle of the current example and that described in Example 1 are very similar, all steps of the PSA cycle be described for completeness.

Steps 1-3: A syngas feed stream (41) is introduced to the bottom of Bed A from the Feed header at high pressure. The syngas feed gas flows from the bottom to the top of Bed A. This upward flow direction will be referred to as co-current flow with respect to feed. During the adsorption step, quantity of gas transferred is adequate to displace the majority of the $N_2$ retained in the bed from the $N_2$ purge steps (PG1, PG2, PG3).

Step 7: The cycle step progresses, and Bed A undergoes the third equalization step (EQ3) and transfers equalization gas to a lower pressure adsorber—Bed E—in step (EQ3') via conduit 47. The pressures of both adsorption beds/vessels are approximately equal at the end of this step.

Step 8: Bed A then proceeds to blowdown (BD). The purpose of this step is to expel impurities adsorbed during co-current steps (AD, EQ) from the adsorber through the bottom of the adsorbent bed/vessel via conduit (48). As a result, contaminants are desorbed and counter-currently directed to a shared waste gas header (51).

Steps 9, 10, & 11: Bed A subsequently progresses to the purge phase. In the PSA process of the present invention, a high-purity N₂ stream substantially free of $H_2O$ and $CO_2$ (49) is utilized for a first portion of the purge phase (i.e., PG1, PG2, PG3). $N_2$ purge gas is introduced to the top of Bed A and flows counter-current to the direction of the feed gas. The purge gas, being substantially free of $H_2O$ and $CO_2$, sweeps the contaminants from the adsorbent bed/vessel through the bottom of the adsorber via conduit (50). As a result, contaminants are desorbed and counter-currently directed to a shared waste gas header (51).

Step 12: With the completion of the high-purity $N_2$ purge steps (9, 10, 11), Bed A is subsequently purged with a $H_2$-containing gas originating from Bed C via conduit 46. Purge gas is introduced to the top of Bed A and flows counter-current to the direction of the feed gas. The purge gas, being substantially free of $H_2O$ and $CO_2$, sweeps the contaminants from the adsorbent bed/vessel through the bottom of the adsorbent bed/vessel via conduit (50). As a result, contaminants are desorbed and counter-currently directed to a shared waste gas header (51).

Step 13: Bed A progresses to the first bed-to-bed repressurization equalization step (EQ3') and receives equalization gas from Bed C via conduit (47). The adsorbers in (EQ3) and (EQ3') steps are interacting such that gas in Bed C is transferred to Bed A until the pressures in both beds are equalized.

Step 14: Bed A progresses to the second bed-to-bed repressurization equalization step (EQ2') and receives equalization gas from Bed D via conduit (45). The adsorbers in (EQ2) and (EQ2') steps are interacting such that gas in Bed D is transferred to Bed A until the pressures in both beds are equalized.

Step 15: In the exemplary 6-1-3 PSA cycle, a HOLD step, in which the adsorber is left dormant with no flow of gas into or out of the bed for the entire step length, is required to balance the cycle. A HOLD step is not a necessary aspect of the invented PSA process. It is merely required for this specific cycle which was selected so as the performance results can be directly compared to those provided in EXAMPLE 1.

Step 16: Bed A progresses to the third bed-to-bed repressurization equalization step (EQ1') and receives equalization gas from Bed E via conduit (44). The adsorbers in (EQ1) and (EQ1') steps are interacting such that gas in Bed E is transferred to Bed A until the pressures in both adsorbent bed/vessel are equalized.

Step 17 & 18: In the last two steps of the cycle, Bed A progresses to the final repressurization (RP) steps. In this example, a portion of the product gas is employed to further raise the pressure in the adsorber to near the product pressure via conduit (43).

With the completion of Step 18, Bed A returns to Step 1 completing the cyclic process. The remaining beds follow the above described cycle with a shift in the step sequence as illustrated in Table 6.

Simulations were completed using the detailed adsorption model described herein above with the adsorbers adsorbent bed/vessel containing a single layer of alkali-promoted alumina as illustrated in FIG. 7. The process conditions for the simulation are given in Table 7. The PSA process was simulated with a 40 s step time giving a total cycle time of 720 s (18 steps). The total volume of purge gas, that is the total volume of high-purity $N_2$ gas (49) and $H_2$-containing purge gas (47), was set to 0.1333, such that the purge-to-feed volume ratio was approximately equivalent to that used in Example 1.

TABLE 7

| Parameter | Value |
| --- | --- |
| Adsorbent | Alkali-promoted Alumina |
| Adsorber Dia [m] | 1.84 |
| Adsorbent Layer Height [m] | 3.66 |
| Feed Rate [kmol/h] | 1115.2 |
| Feed Pressure [bara] | 29.66 |
| Feed Temperature [K] | 314.9 |
| Feed Gas Comp. [%] | 63.52% $H_2$, 29.09% CO, 1.52% $CH_4$, 5.42% $CO_2$, 0.13% $N_2$, 0.33% $H_2O$ |
| Purge Rate [kmol/h] | |
| High-purity N2 (49) | 111.15 |
| Purge Pressure [bara] | 1.3 |
| Purge Temperature [K] | 309.26 |
| Purge Gas Comp. [%] | |
| High-purity $N_2$ (49) | 99.999+% $N_2$ |

Simulation results are presented in Table 8. The definition and algebraic expression for the once-through and overall recovery are defined herein above. The once-though and overall recovery for the current exemplary PSA process are the same because the $H_2$-containing gas used for purging during the second portion of the purge phase originates internal to the PSA process. As such, since $F_{purge}=0$ kmol/h, the overall recovery formula reduces to the once-through recovery formula. In comparison to the externally purged process illustrated in Example 1, the once-through recovery for $H_2$, CO, and $CH_4$ are 0.7, 0.8, and 2.0 points lower respectively. However, since the $H_2$-containing purge gas originated internally to the PSA process, the overall recovery is unaffected and in fact, the overall recovery is 2.0, 2.8, and 2.3 point higher than the process utilizing a purge gas originating external to the PSA process. Similar to the PSA-based processes described in Example 1, the process of the current example is also more selective for CO than $N_2$ ($CO/N_2$=228.7), however, to a lesser extent due to a higher $N_2$ concentration in the $H_2$-containing gas used for purge.

TABLE 8

| Syngas Component | Recovery |
| --- | --- |
| $H_2$ | 93.2 |
| CO | 90.6 |
| $CH_4$ | 89.2 |

Comparative Example 3

An additional embodiment of the PSA process of the present invention is described herein to illustrate the benefit of the novel purging strategy of the present invention. In the current example, the performance of two 16-adsorber PSA processes employing the a 16-3-8 cycle (16-adsorbent bed/vessel, 3 adsorbent bed/vessel simultaneously on feed, and 8 bed-to-bed equalization steps) is provided to demonstrate the benefit that portioning the purge phase has on the overall recovery even in PSA cycles with high degrees of reflux (or equalization) to achieve high recovery. The first 16-3-8 PSA process, described here in as the 'related art' PSA process, uses a $H_2$-containing gas substantially free of $H_2O$ and $CO_2$ originating externally from the PSA process for the entire purge phase. The second 16-3-8 PSA process, described here in as the PSA process of the present invention, uses a high-purity $N_2$ substantially free of $H_2O$ and $CO_2$ that is utilized for a first portion of the purge phase and a $H_2$-containing gas substantially free of $H_2O$ and $CO_2$ that is utilized for a second portion of the purge phase. The PSA cycle is given in Table 11, below, and a schematic representation of a single adsorbent bed/vessel (i.e., Bed A) progressing through the complete PSA cycle showing the flow of gas is provided in Table 9.

TABLE 9

| Parameter | Value |
| --- | --- |
| Adsorbent | Alkali-promoted Alumina |
| Adsorber Dia [m] | 1.06 |
| Adsorbent Layer Height [m] | 5.49 |
| Feed Rate [kmol/h] | 855.0 |
| Feed Pressure [bara] | 29.66 |
| Feed Temperature [K] | 314.9 |
| Feed Gas Comp. [%] | 63.52% $H_2$, 29.09% CO, 1.52% $CH_4$, 5.42% $CO_2$, 0.13% $N_2$, 0.33% $H_2O$ |
| Purge Rate [kmol/h] | |
| High-purity $N_2$ (93a) | 85.5 |
| $H_2$-containing gas (73; 93b) | 106.9; 21.4 |
| Purge Pressure [bara] | 1.3 |
| Purge Temperature [K] | 309.26 |
| Purge Gas Comp. [%] | |
| High-purity $N_2$ (93a) | 99.999+% $N_2$ |
| $H_2$-containing gas (73 & 93b) | 56.27% $H_2$, 43.32% CO, 0.18% $CH_4$, 0.23% $N_2$ |

A detailed description of the PSA cycle steps and the schematic diagrams are not provided as they are similar to that described in Example 1 with the following exceptions: 1) the number of AD steps is increased from 3 to 6, 2) the number of beds simultaneously processing feed gas is increased from 1 to 3, 3) the number of EQ steps is increased from 3 to 8, 4) the number of purge steps including PGa and PGb steps is increased from 4 to 8 and thus the ratio of purge steps to feed steps remains the same (i.e., 1.33), and 5) the number pf PP steps is decreased from 2 to 1.

Simulations of the two PSA processes—'Related Art' and the 'Present Invention'—were completed using the detailed adsorption model described herein above with the adsorbent bed/vessel containing a single layer of alkali-promoted alumina for an adsorbent bed height of 18 ft. For both PSA processes in this example, the $H_2$-containing gas used for purging originated externally from the PSA process, for example from a downstream separation system. The process conditions for the simulation are given in Table 10.

The PSA process was operated with a 40 s step time giving a total cycle time of 1280 s (32 steps). Both PSA processes were simulated having a purge-to-feed volume ratio of 0.133, where the purge-to-feed volume ratio is herein defined as the total volume of purge gas utilized per cycle to the total volume of feed gas processed.

Results from the simulation are summarized in Table 10 as once-through and overall recovery for each of the primary syngas components (i.e., $H_2$, CO, $CH_4$). The once-through recovery for each of the primary syngas components is approximately the same for both the 'related art' and invented PSA processes. As discussed above in Example 1, this observation indicates that the type of purge gas, either $H_2$-containing gas only as in the 'related art' process or a sequential combination of high-purity $N_2$ followed by $H_2$-containing gas as taught in the present invention, has essentially no effect on the product gas flow rate or composition. The PSA process of the present invention, however, exhibits significantly higher overall recovery of the primary syngas components and most desirably $H_2$ and CO. In fact, the overall recovery of $H_2$ and CO for the invented process are 7.6 and 11.5 points greater respectively compared to the 'related art' process. Further, the $N_2$ impurity in the product gas stream was found to be essentially the same for both processes (i.e., 0.135%) and the CO/$N_2$ ratio increased in the product gas to 228.5 which is an improvement over the conventional purification processes as described above.

TABLE 10

| | Once-through Recovery [%] | | | Overall Recovery [%] | | | $N_2$ Impurity in Product Gas |
| --- | --- | --- | --- | --- | --- | --- | --- |
| | $H_2$ | CO | $CH_4$ | $H_2$ | CO | $CH_4$ | (62, 82) [%] |
| Related Art PSA Process | 98.0 | 97.3 | 93.8 | 87.6 | 81.2 | 92.3 | 0.135 |
| Invented PSA Process | 98.0 | 97.3 | 93.8 | 95.2 | 92.7 | 93.4 | 0.135 |

TABLE 11

| Adsorber | STEP # | | | | | | | | | | | | | | | | | |
|---|---|---|---|---|---|---|---|---|---|---|---|---|---|---|---|---|---|---|
| | 1 | 2 | 3 | 4 | 4 | 6 | 7 | 8 | 9 | 10 | 11 | 12 | 13 | 14 | 15 | 16 | 17 | 18 |
| A | AD1 | AD2 | AD3 | AD4 | AD5 | AD6 | EQ1 | EQ2 | EQ3 | EQ4 | EQ5 | EQ6 | EQ7 | EQ8 | BD | PGa | PGa | PGa |
| B | EQ1' | PP | AD1 | AD2 | AD3 | AD4 | AD5 | AD6 | EQ1 | EQ2 | EQ3 | EQ4 | EQ5 | EQ6 | EQ7 | EQ8 | BD | PGa |
| C | EQ3' | EQ2' | EQ1' | PP | AD1 | AD2 | AD3 | AD4 | AD5 | AD6 | EQ1 | EQ2 | EQ3 | EQ4 | EQ5 | EQ6 | EQ7 | EQ8 |
| D | EQ5' | EQ4' | EQ3' | EQ2' | EQ1' | PP | AD1 | AD2 | AD3 | AD4 | AD5 | AD6 | EQ1 | EQ2 | EQ3 | EQ4 | EQ5 | EQ6 |
| E | EQ7' | EQ6' | EQ5' | EQ4' | EQ3' | EQ2' | EQ1' | PP | AD1 | AD2 | AD3 | AD4 | AD5 | AD6 | EQ1 | EQ2 | EQ3 | EQ4 |
| F | PGb | EQ8' | EQ7' | EQ6' | EQ5' | EQ4' | EQ3' | EQ2' | EQ1' | PP | AD1 | AD2 | AD3 | AD4 | AD5 | AD6 | EQ1 | EQ2 |
| G | PGa | PGb | PGb | EQ8' | EQ7' | EQ6' | EQ5' | EQ4' | EQ3' | EQ2' | EQ1' | PP | AD1 | AD2 | AD3 | AD4 | AD5 | AD6 |
| H | PGa | PGa | PGa | PGb | PGb | EQ8' | EQ7' | EQ6' | EQ5' | EQ4' | EQ3' | EQ2' | EQ1' | PP | AD1 | AD2 | AD3 | AD4 |
| I | PGa | PGa | PGa | PGa | PGa | PGb | PGb | EQ8' | EQ7' | EQ6' | EQ5' | EQ4' | EQ3' | EQ2' | EQ1' | PP | AD1 | AD2 |
| J | BD | PGa | PGa | PGa | PGa | PGa | PGa | PGb | PGb | EQ8' | EQ7' | EQ6' | EQ5' | EQ4' | EQ3' | EQ2' | EQ1' | PP |
| K | EQ7 | EQ8 | BD | PGa | PGa | PGa | PGa | PGa | PGa | PGb | PGb | EQ8' | EQ7' | EQ6' | EQ5' | EQ4' | EQ3' | EQ2' |
| L | EQ5 | EQ6 | EQ7 | EQ8 | BD | PGa | PGa | PGa | PGa | PGa | PGa | PGb | PGb | EQ8' | EQ7' | EQ6' | EQ5' | EQ4' |
| M | EQ3 | EQ4 | EQ5 | EQ6 | EQ7 | EQ8 | BD | PGa | PGa | PGa | PGa | PGa | PGa | PGb | PGb | EQ8' | EQ7' | EQ6' |
| N | EQ1 | EQ2 | EQ3 | EQ4 | EQ5 | EQ6 | EQ7 | EQ8 | BD | PGa | PGa | PGa | PGa | PGa | PGa | PGb | PGb | EQ8' |
| O | AD5 | AD6 | EQ1 | EQ2 | EQ3 | EQ4 | EQ5 | EQ6 | EQ7 | EQ8 | BD | PGa | PGa | PGa | PGa | PGa | PGa | PGb |
| P | AD3 | AD4 | AD5 | AD6 | EQ1 | EQ2 | EQ3 | EQ4 | EQ5 | EQ6 | EQ7 | EQ8 | BD | PGa | PGa | PGa | PGa | PGa |

| Adsorber | STEP # | | | | | | | | | | | | | |
|---|---|---|---|---|---|---|---|---|---|---|---|---|---|---|
| | 19 | 20 | 21 | 22 | 23 | 24 | 25 | 26 | 27 | 28 | 29 | 30 | 31 | 32 |
| A | PGa | PGa | PGa | PGb | PGb | EQ8' | EQ7' | EQ6' | EQ5' | EQ4' | EQ3' | EQ2' | EQ1' | PP |
| B | PGa | PGa | PGa | PGa | PGa | PGb | PGb | EQ8' | EQ7' | EQ6' | EQ5' | EQ4' | EQ3' | EQ2' |
| C | BD | PGa | PGa | PGa | PGa | PGa | PGa | PGb | PGb | EQ8' | EQ7' | EQ6' | EQ5' | EQ4' |
| D | EQ7 | EQ8 | BD | PGa | PGa | PGa | PGa | PGa | PGa | PGb | PGb | EQ8' | EQ7' | EQ6' |
| E | EQ5 | EQ6 | EQ7 | EQ8 | BD | PGa | PGa | PGa | PGa | PGa | PGa | PGb | PGb | EQ8' |
| F | EQ3 | EQ4 | EQ5 | EQ6 | EQ7 | EQ8 | BD | PGa | PGa | PGa | PGa | PGa | PGa | PGb |
| G | EQ1 | EQ2 | EQ3 | EQ4 | EQ5 | EQ6 | EQ7 | EQ8 | BD | PGa | PGa | PGa | PGa | PGa |
| H | AD5 | AD6 | EQ1 | EQ2 | EQ3 | EQ4 | EQ5 | EQ6 | EQ7 | EQ8 | BD | PGa | PGa | PGa |
| I | AD3 | AD4 | AD5 | AD6 | EQ1 | EQ2 | EQ3 | EQ4 | EQ5 | EQ6 | EQ7 | EQ8 | BD | PGa |
| J | AD1 | AD2 | AD3 | AD4 | AD5 | AD6 | EQ1 | EQ2 | EQ3 | EQ4 | EQ5 | EQ6 | EQ7 | EQ8 |
| K | EQ1' | PP | AD1 | AD2 | AD3 | AD4 | AD5 | AD6 | EQ1 | EQ2 | EQ3 | EQ4 | EQ5 | EQ6 |
| L | EQ3' | EQ2' | EQ1' | PP | AD1 | AD2 | AD3 | AD4 | AD5 | AD6 | EQ1 | EQ2 | EQ3 | EQ4 |
| M | EQ5' | EQ4' | EQ3' | EQ2' | EQ1' | PP | AD1 | AD2 | AD3 | AD4 | AD5 | AD6 | EQ1 | EQ2 |
| N | EQ7' | EQ6' | EQ5' | EQ4' | EQ3' | EQ2' | EQ1' | PP | AD1 | AD2 | AD3 | AD4 | AD5 | AD6 |
| O | PGb | EQ8' | EQ7' | EQ6' | EQ5' | EQ4' | EQ3' | EQ2' | EQ1' | PP | AD1 | AD2 | AD3 | AD4 |
| P | PGa | PGb | PGb | EQ8' | EQ7' | EQ6' | EQ5' | EQ4' | EQ3' | EQ2' | EQ1' | PP | AD1 | AD2 |

Although various embodiments have been shown and described, the present disclosure is not so limited and will be understood to include all such modification and variations as would be apparent to one skilled in the art.

What is claimed is:

1. An integrated process for the individual recovery of at least a purified $H_2$-rich gas and a purified CO-rich gas from a hydrocarbon feedstock comprising:
   a. introducing a hydrocarbon feedstock into a syngas generating unit and generating a superatmospheric pressure syngas stream consisting essentially of at least $H_2$, CO, $CH_4$, $CO_2$, and $H_2O$;
   b. feeding the generated superatmospheric pressure syngas stream to a pressure swing adsorption (PSA)-based purification process unit to produce a superatmospheric pressure syngas stream substantially free of $H_2O$ and $CO_2$,
   c. routing the superatmospheric pressure syngas stream substantially free of $H_2O$ and $CO_2$ to a separation system producing at least a $H_2$-rich stream and a CO-rich stream; and
   d. wherein the PSA-based purification process unit is purged with high-purity $N_2$ stream for a first portion of a purge phase and with $H_2$-containing gas substantially free of $H_2O$ and $CO_2$ for a second portion of the purge phase.

2. The integrated process of claim 1, wherein the syngas generation system is selected from a steam reformer, an autothermal reformer, or a partial oxidation reactor.

3. The integrated process of claim 1, wherein the hydrocarbon feedstock is natural gas.

4. The integrated process of claim 1, wherein the high-purity Na stream used during the first portion of the purge phase is generated by a cryogenic air separation unit.

5. The integrated process of claim 1, wherein a portion of the superatmospheric pressure syngas stream substantially free of $H_2O$ and $CO_2$ obtained from the PSA-based purification process unit is used as the $H_2$-containing gas during the second portion of the purge phase.

6. The integrated process of claim 1, wherein a portion of a $H_2O$ and $CO_2$ free syngas stream originating in the separation system is used as the $H_2$-containing gas during the second portion of the purge phase.

7. The integrated process of claim 1, wherein a portion of the $H_2$-rich product gas obtained from the separation system is used as the $H_2$-containing gas during the second portion of the purge phase.

8. The integrated process of claim 1, wherein the separation system is comprised of at least a cryogenic separation unit and a second PSA unit.

9. The integrated process of claim 1, wherein the $H_2$-containing gas during the second portion of the purge phase originates from within the PSA-based purification process unit.

10. The integrated process of claim 1, wherein the separation system is comprised of at least membrane system for obtaining a purified $H_2$-rich gas and a purified CO-rich gas.

11. The integrated process of claim 1, wherein the waste gas from the pressure swing adsorption (PSA)-based purification process unit is used as a low-pressure fuel stream.

12. The integrated process of claim 1, wherein the waste gas from the pressure swing adsorption (PSA)-based purification process unit is recycled to the syngas generation unit as a low-pressure fuel stream.

13. The PSA process of claim 4, wherein the high-purity $N_2$ stream is extracted from a high-pressure column of the cryogenic air separation unit.

14. A PSA process for purifying a super-atmospheric pressure syngas stream containing at least $H_2$, CO and $CO_2$ and $H_2O$ which comprises introducing a super-atmospheric pressure syngas stream to a pressure swing adsorption (PSA) process system having a plurality of adsorbent-containing beds that selectively remove substantially all $H_2O$ and $CO_2$ while discharging a super-atmospheric pressure syngas stream that is substantially free of $H_2O$ and $CO_2$, wherein the PSA process system is purged with a high-purity $N_2$ gas stream substantially free of $H_2O$ and $CO_2$ for a first portion of a purge phase and with a $H_2$-containing gas stream substantially free of $H_2O$ and $CO_2$ for a second portion of the purge phase.

15. The PSA process of claim 14, wherein a portion of the superatmospheric pressure syngas stream substantially free of $H_2O$ and $CO_2$ obtained from the pressure swing adsorption (PSA)-based purification process unit is used as the $H_2$-containing gas during the second portion of the purge phase.

16. The PSA process of claim 14, wherein the $H_2$-containing gas during the second portion of the purge phase originates from within the PSA-based purification process unit.

17. The PSA process of claim 14, wherein the $H_2$-containing gas during the second portion of the purge phase originates externally from the PSA process.

* * * * *

UNITED STATES PATENT AND TRADEMARK OFFICE
CERTIFICATE OF CORRECTION

PATENT NO. : 11,485,637 B2
APPLICATION NO. : 17/076385
DATED : November 1, 2022
INVENTOR(S) : Luke J. Coleman et al.

It is certified that error appears in the above-identified patent and that said Letters Patent is hereby corrected as shown below:

On the Title Page

Item (74) Attorney, Agent, or Firm, please correct as follows:
(74) Attorney, Agent, or Firm - Iurie A. Schwartz Signed and Sealed this
Sixth Day of December, 2022

Katherine Kelly Vidal
*Director of the United States Patent and Trademark Office*